US007403744B2

(12) United States Patent
Bridgelall (10) Patent No.: US 7,403,744 B2
(45) Date of Patent: Jul. 22, 2008

(54) SELF-ASSOCIATING WIRELESS PERSONAL AREA NETWORK

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 408 days.

(21) Appl. No.: 10/883,005

(22) Filed: Jun. 30, 2004

(65) Prior Publication Data
US 2005/0201301 A1   Sep. 15, 2005

Related U.S. Application Data

(63) Continuation-in-part of application No. 10/799,063, filed on Mar. 11, 2004.

(51) Int. Cl.
H04B 7/00 (2006.01)
(52) U.S. Cl. .................. 455/41.2; 455/41.1; 455/456.1; 455/456.2; 340/572.4; 340/10.1; 340/539.21; 370/328; 370/338
(58) Field of Classification Search ................ 455/41.2, 455/456.1, 456.2, 41.3, 226, 41.1; 370/335, 370/342, 328, 338; 340/10.34, 10.2, 572.4, 340/10.1, 326, 505, 539.21, 539.32
See application file for complete search history.

(56) References Cited

U.S. PATENT DOCUMENTS

| | | | | |
|---|---|---|---|---|
| 6,330,452 | B1 * | 12/2001 | Fattouche et al. | 455/456.1 |
| 6,745,038 | B2 * | 6/2004 | Callaway et al. | 455/456.1 |
| 6,771,933 | B1 * | 8/2004 | Eng et al. | 455/41.2 |
| 7,024,207 | B2 * | 4/2006 | Gorday et al. | 455/456.1 |
| 2002/0075940 | A1 * | 6/2002 | Haartsen | 375/132 |
| 2002/0116460 | A1 * | 8/2002 | Treister et al. | 709/204 |
| 2003/0078002 | A1 * | 4/2003 | Sanjeev et al. | 455/41 |
| 2004/0029582 | A1 * | 2/2004 | Swab et al. | 455/426.1 |
| 2004/0033808 | A1 * | 2/2004 | Rorabaugh | 455/456.1 |
| 2004/0204046 | A1 * | 10/2004 | Bonta et al. | 455/556.1 |
| 2004/0212500 | A1 * | 10/2004 | Stilp | 340/541 |
| 2004/0259544 | A1 * | 12/2004 | Amos | 455/435.1 |
| 2005/0026569 | A1 * | 2/2005 | Lim et al. | 455/73 |

(Continued)

OTHER PUBLICATIONS

Binay Sugla, Method of improving location accuracy, achieving seamless tracking and enabling novel applications using information from multiple location and positioning technologies, Nov. 18, 2003.*

*Primary Examiner*—Matthew Anderson
*Assistant Examiner*—Tuan Pham
(74) *Attorney, Agent, or Firm*—Ingrassia Fisher & Lorenz, P.C.

(57) ABSTRACT

Methods and apparatus are provided for automatically and autonomously forming a wireless personal area network (WPAN) from an array of intercommunicating personal area network (PAN) devices. The devices comprise first communicators associated with primary functions of the devices and second communicators coupled to the first communicators for determining a subset of the devices meeting predetermined association criteria, from which subset the first communicators form the WPAN. In a preferred embodiment, the second communicators include range measuring transceivers and processors coupled to the transceivers that cooperate to determine range and relative motion of elements within communication range of the first communicators for comparison to range and relative motion association criteria stored in one or more of the devices. Memory is desirably included for storing the association criteria. The subset of devices automatically elects a master device that communicates with the other devices of the subset to form the WPAN.

19 Claims, 7 Drawing Sheets

U.S. PATENT DOCUMENTS

| | | | |
|---|---|---|---|
| 2005/0107953 A1* | 5/2005 | Sugla | 701/300 |
| 2005/0124380 A1* | 6/2005 | Rokusek et al. | 455/556.1 |
| 2005/0143011 A1* | 6/2005 | Jacobsen | 455/67.13 |
| 2005/0156711 A1* | 7/2005 | Aljadeff et al. | 340/10.34 |
| 2006/0160573 A1* | 7/2006 | Montvay | 455/563 |

* cited by examiner

FIG. 8B

SELF-ASSOCIATING WIRELESS PERSONAL AREA NETWORK

CROSS-REFERENCES TO RELATED APPLICATIONS

This is a continuation-in-part of application Ser. No. 10/799,063, filed Mar. 11, 2004.

FIELD OF THE INVENTION

The present invention generally relates to wireless communication among distributed elements, and more particularly to automatic association of such distributed elements into a wireless personal area network (WPAN).

BACKGROUND OF THE INVENTION

Many modern electronic devices are portable and capable of communicating with each other and various base stations using wireless signaling. Non-limiting examples are 2-way radios, telephones, headsets, bar code scanners, Global Positioning System (GPS) units, Personal Digital Assistants (PDAs), portable computers (PCs), printers, digital cameras, RF identification (RFID) tag readers/writers, chart plotters, and so forth. Sometimes, a number of these various elements may be carried by or associated with a single user or function and it is desired to mutually associate them electronically to form a wireless personal area network (WPAN). Once associated, the cooperating elements can exchange or share data by communicating directly with each other rather than indirectly via a central hub, and in general, ignore other units that may be within communication range but which are not part of the WPAN. It is known in the prior art to form such WPANs, but the association of the various elements into the WPAN had to be carried out manually. This is done, for example, by entering into each unit the identity of the other elements of the WPAN. Another way is to use a local sub-master unit as a temporary hub. The identities (IDs) of the units intended to make up the WPAN are manually entered or scanned into the sub-master and then the association information downloaded from the sub-master to each of the WPAN elements. While this approach works it suffers from a number of disadvantages among which are: it is time consuming to manually reconfigure and associate the units for a particular WPAN; the WPAN make-up is not easily changed, that is, it is static rather than dynamic; it is more complex and inflexible than is desired; and it may require that the individual elements of the WPAN consume more power.

Accordingly, it is desirable to provide an improved arrangement for forming and using WPANs, especially to provide an arrangement and method capable of forming and reforming WPAN associations automatically. In addition, it is desirable that the arrangement and method be robust and inexpensive relative to the prior art and, insofar as possible, take advantage of existing technology and devices. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

An apparatus is provided for automatically and autonomously forming a wireless personal area network (WPAN) from an array of intercommunicating personal area network (PAN) devices. The devices comprise first communicators associated with primary functions of the devices and second communicators coupled to the first communicators for determining a subset of the devices meeting predetermined association criteria, from which subset the first communicators form the WPAN. In a preferred embodiment, the second communicators include range measuring transceivers and processors coupled to the transceivers that cooperate to determine range and relative motion of elements within communication range of the first communicators for comparison to range and relative motion association criteria stored in one or more of the devices. Memory is desirably included for storing the association criteria. The subset of devices automatically elects a master device that communicates with the other devices of the subset to form the WPAN.

A method is provided for automatically and autonomously forming a Wireless Personal Area Network (WPAN) from a plurality of Personal Area Network (PAN) devices. The method comprises identifying those wireless devices within mutual communication range, determining a subset of wireless devices meeting predetermined association criteria from among the identified wireless devices, electing a master device from among the subset of devices, and forming the WPAN from the subset of devices with the master device. In a preferred embodiment, the determining step comprises measuring range and relative motion of the identified devices, comparing the measured range and relative motion to range and relative motion association criteria, and selecting as the subset those devices whose range and relative motion meet the association criteria. It is further desirable after the forming step to repeat an identifying step until a further device appears within or an existing device disappears from mutual communication range, and then repeating the determining, electing and forming steps for such modified group of devices within mutual communication range.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
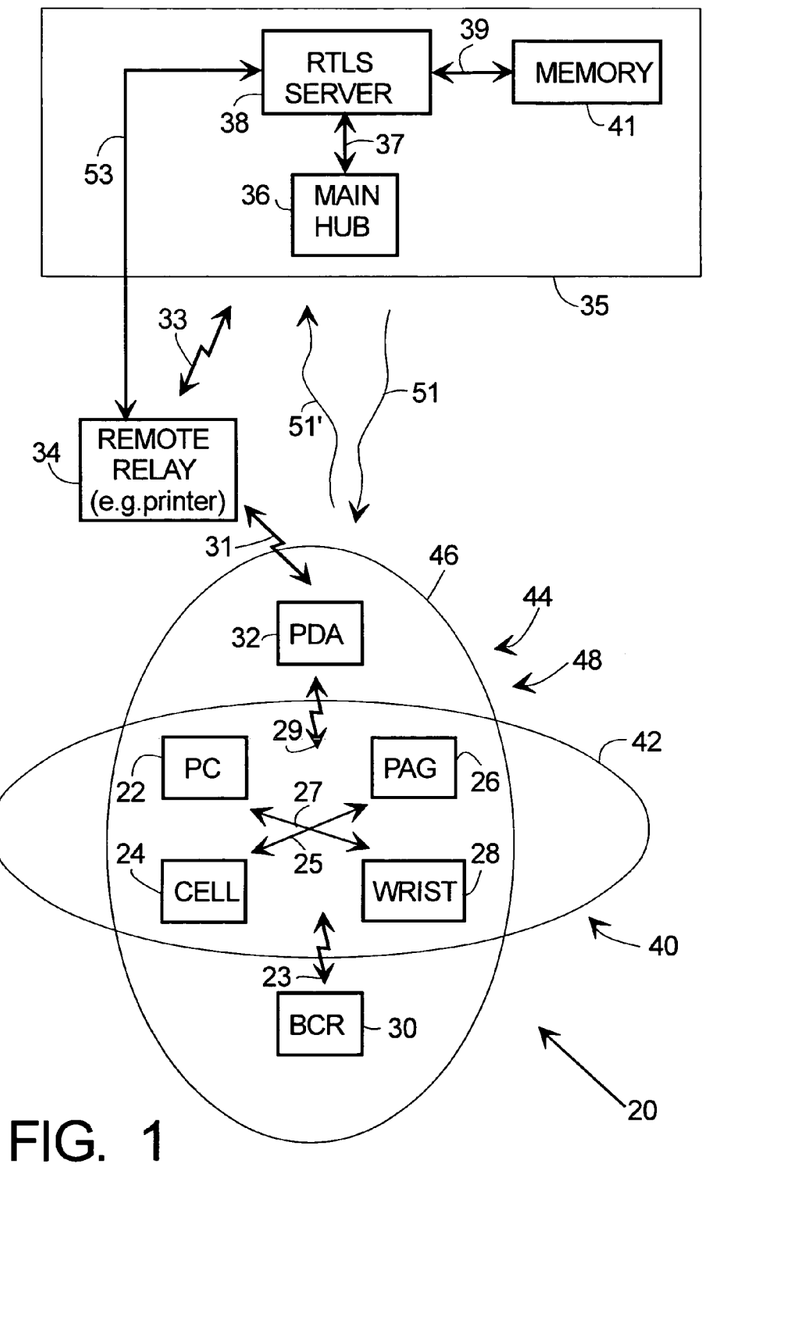
FIG. 1 is a simplified schematic diagram of a number of wireless elements forming a WPAN and illustrating coupling thereof to a base station.

FIG. 1 is a simplified schematic diagram of system 20 comprising a number of wireless elements 22, 24, 26, 28 forming WPAN 40 within spatial boundary 42 and illustrating coupling of WPAN 40 to base station 35 via main hub 36 and other elements 32, 34. For simplicity, the various antennas associated with elements 22, 24, 26, 28, 30, 32, 34, 36 needed to provide communication over wireless links 23, 25, 27, 29, 31, 33 are omitted from FIG. 1. However, persons of skill in the art will understand that antennas are included with the various wireless communication elements. For convenience of explanation, it is assumed that elements 22, 24, 26, 28 and 30, 32, 34 are in close proximity and able to mutually communicate at lower power and, perhaps, relatively higher speed over wireless links 23, 25, 27, 29 using, for example, the well-known Bluetooth® protocol. However, this is not intended to be limiting and any convenient shorter range (SR), lower power (LP) communication protocol (abbreviated collectively as "SR-LP") may be used. Elements 34 and 36 mutually communicate via wireless link 33 at longer range and at higher power but, perhaps, relatively lower speed using, for example, the 802.11 signaling protocol. However, this is not intended to be limiting and any signaling protocol capable of transferring the necessary information may be used. As used herein, the term longer range (LR), higher power (HP), abbreviated collectively as "LR-HP", is intended to generally refer to such a communication system irrespective of the particular construction or signaling protocol used. Alternatively, wireline communication link 53 may be provided between server 38 and relay 34 instead of or in addition to wireless link 33 between elements 34, 36. Thus, in the preferred embodiment, at least two communication links are desirably used: (1) a SR preferably LP link among the various distributed elements 22, 24, 26, 28 and 30, 32, 34 and, (2) a LR preferably HP link (e.g., link 33) or a wireline link (e.g., link 53) between at least one of the distributed elements (e.g., element 34) and a base station (e.g., base station 35 of FIG. 1) that includes or is coupled to a central server. Bluetooth is a non-limiting example of a suitable SR-LP communication arrangement and 802.11 is a non-limiting example of a LR-HP communication arrangement, but neither is essential and other signaling protocols and arrangements may also be used. Non-limiting examples of alternative signaling protocols and arrangements are Zigbee™ and Ultra-Wideband (UWB) for which industry working groups have been formed. As will be more fully explained later other alternatives exist for communication link 33. For example, where separate signal relay 34 does not exist, this function can be assumed by one of the WPAN devices capable of acting as a master unit. Bluetooth also provides a LR-LP signaling protocol as well as the more typical SR-LP signaling protocol.

Elements 22, 24, 26, 28 30, 32, 34 illustrate different types of wireless elements that may be in simultaneous use in the same general area. For example, and not intended to be limiting, element 22 can be a personal computer (abbreviated as "PC"), element 24 a cell phone (abbreviated as "CELL") perhaps with an included digital still or video camera, element 26 a 1-way or 2-way pager (abbreviated as "PAG"), element 28 a wrist mounted communicator or watch or compass or GPS unit or a combination thereof (abbreviated as "WRIST"), element 30 a bar code reader (abbreviated as "BCR"), element 32 a personal digital assistant (abbreviated as "PDA") and element 34 a printer, which in this example also functions as a remote relay. These particular examples are provided merely for convenience of explanation and are not intended to be limiting. Any type of electronic device may be utilized in place of or in addition to the elements illustrated herein. As will be subsequently explained in more detail, elements 22-32 form ad-hoc network 44 within boundary 46, in that they are all within mutual SR-LP communication range of each other. PDA 32 is illustrated as being able to communicate with remote relay (e.g., printer) 34 and thereby provides a gateway for any of devices 22-30 to address remote relay (e.g., printer) 34, and in turn use remote relay 34 as a communication bridge for sending or receiving information from base station 35 via LR-HP wireless communication link 33 or alternatively via wireline communication link 53. Persons of skill in the art will understand that remote relay 34 is identified as a printer merely for convenience of explanation and that remote relay 34 may have any other function in addition to its dual mode communication relay function providing both wireless SR-LP communication link 31 or wireline communication link 53 and LP-HP communication link 33. Where devices 44 are generally located in a predetermined area, such as for example, but not limited to a warehouse, storage yard, shipping facility or the like, then devices having a reasonably even distribution in the facility are good candidates for remote relay 34. Non-limiting examples are water coolers, vending machines, photocopiers, image scanners, wall telephones and so forth. Such devices are typically connected to the facility power lines or phone lines or both and wireline communication therewith can be easily provided, for example, using Ethernet™ or Power-over-Ethernet (e.g., IEEE 802.3af) or other convenient wireline protocol or arrangement. In these circumstances wireless communication link 33, while possible, is not essential and wireline communication link 53 is convenient.

In the prior art, WPAN 40 would have been formed by manually entering the WPAN identification data for the elements within outline 42 into the various elements or by using a barcode ring scanner with Bluetooth coupling to scan the identification code of the local master (e.g., element 32) for subsequent direct association. In the present invention, each of elements 22, 24, 26, 28, 30, 32, 34 has an RF identification tag (RFID) function included therein, that may be addressed by base station 35 using wireless communication paths 51, 51' to determine their individual location relative to base station 35. Within base station 35 are main hub transceiver 36 and location server 38 which determine the current location of elements 22, 24, 26, 28, 30, 32, 34 using any convenient RFID location technique. It does this in substantially real time. Non-limiting examples of suitable real time location system (RTLS) technologies are received signal strength indication (RSSI), time difference of arrival (TDOA) and phase difference of arrival (PDOA). These provide location information by triangulation using multiple transmitters or receivers. U.S. Pat. No. 6,414,626 B1, for example, describes an arrangement for measuring RFID tag range using a single transceiver operating at multiple frequencies. Range data from multiple transceivers may be used to provide location data. This is merely an example of many ways known in the art for obtaining location data using RFID tags or RFID functions. Any suitable position locating technology may be employed by main hub 36 and server 38 to determine the position of elements 22, 24, 26, 28, 30, 32, 34. These technologies can employ reflective back scattering for position location and need not rely on active signal transmission from elements 22, 24, 26, 28, 30, 32, 34. Thus, elements 22, 24, 26, 28, 30, 32, 34 need not transmit higher power signals for this purpose. This greatly simplifies many of elements 22, 24, 26, 28, 30, 32, 34 and reduces their power consumption. However, the use of locating signal transmitters on such elements is not precluded. Once the locations of these elements are known, then server 38 determines which subsets should logically form one or more WPANs. Server 38 then creates an association table. The association table is transmitted, for example, to elements 22, 24, 26, 28 via remote relay element 34 using LR-HP communication link 33 or wireline link 53. Element 34 then relays the information to element 32 and elements 22, 24, 26, 28 using, for example, Bluetooth over wireless links 31, 29. Thereafter, units 22, 24, 26, 28 for example, mutually communicate with each other as shown by wireless paths 25, 27 and with elements 32 (and through 32 to 34) as shown by wireless paths 29, 31 using SR-LP communication links 31, 29, 27, 25.

Server 38 can logically determine which elements should form a WPAN using any number of predetermined and/or adaptive criteria. Non-limiting examples of such criteria are: (a) associating elements that are within spatial boundary 42 of a predetermined size and/or shape, and/or (b) associating elements that are within spatial boundary 42 for a predetermined time $t=t1$, and/or (c) associate elements that move together substantially as a group for a predetermined time $t2$. Adaptive criteria may also be used, for example, tracking the whereabouts of elements 22, 24, 26, 28 relative to element 32 and/or element 34 and associating those elements that are within a predetermined distance of elements 32 and/or 34, and then repeating such associating steps periodically after time intervals $t=t3$. The duration of $t3$ may be made smaller or larger depending upon the rate of change of relative position of the elements, that is, their re-association may be carried out more or less frequently depending upon how rapidly the relative locations of the associated elements change with respect to each other and/or to their communication links 32, 34. The size of spatial boundary 42 and time durations $t1$, $t2$, $t3$ may be stored in memory 41 coupled to server 38 by link 39, or at any other convenient location in system 20. While element 32 is identified in the forgoing explanation as being outside of WPAN 40 but close enough so that it can relay the Bluetooth signals from elements 22, 24, 26, 28 of WPAN 40 to remote relay element 34, this is merely to illustrate a more general situation. Element 32 could equally well be a part of WPAN 40 if it satisfies the desired association criteria. Similarly, element 30 while also in Bluetooth communication range of some or all of elements 22, 24, 26, 28 but not a part of WPAN 40 could also be a part of WPAN 40, depending upon the association criteria applied by server 38.

An advantage of the present invention is that the signals 51, 51' generally used to identify the elements to be associated and signals 33 (and/or wireline link 53) to transmit the association table, for the most part, need not be encrypted, thereby simplifying the signaling system. Once the various elements have been associated into WPAN 40, then the SR-LP (e.g., Bluetooth) signals being exchanged over wireless paths 25, 27 within WPAN 40 and paths 29, 31 with links 32, 34 may be encrypted so that data security is maintained. The low radiated power of the SR-LP signals among elements 22, 24, 26, 28, 30, 32, 34 also aids in privacy.

The following is an example of the application of the invented means and method to a military, public safety or rescue person carrying a number of sensors and other devices. Assume that the person enters the unit equipment locker or equipment storage place and loads up with equipment needed for a particular mission. The equipment may be worn or carried by the person on the mission. Such equipment can include some or all of the following: a helmet mounted communication headset, a GPS position locator, a heartbeat monitor, a temperature monitor, a two-way radio, a data telemetry link, a "Hazmat" environmental hazards monitor, a chart display, night vision goggles, a personal position locator, an oxygen or air tank pressure monitor, fire-arm, multi-purpose flashlight, etc., each of which is equipped with an RFID transponder and SR-LP communication capability or equivalent. The local equivalent of base station 35 of FIG. 1 determines, using the RFID techniques mentioned above or equivalent, that the above-listed elements are located within a very small spatial envelope (e.g., on the person's body or equipment harness) and moving together (when he or she moves they all move). Accordingly, it determines that they should form a WPAN. Other equipments located within the storage space is not included within this WPAN because they do not move as a group. Base station 35 then transmits the corresponding association table to whichever of the elements being carried by the person is acting as the signal relay (equivalent to element 34) and local master (e.g., element 32). If a signal relay does not exist in the WPAN, then any master device can satisfy this requirement as long as it is within range of base station 35 by using a SR-LP or LR-LP link with the base station. For example, Bluetooth has LR-LP link capability as well SR-LP link capability and the LR-LP link can be used instead of the 802.11 LR-HP link. The signal relay and local master in turn instruct each associated element to inter-communicate using their built-in SR-LP communication protocol (e.g., Bluetooth) and what addresses to use to send critical status data (e.g., heart rate, Hazmat data, temperature, oxygen tank pressure, etc.) via the relay or other link back to base station 35 or another monitor point located in the field where the mission will be carried out. The user needs to do nothing to form his or her WPAN. It is accomplished automatically as he or she chooses his or her personal instrumentation package and moves within or about or exits from the equipment storage location.

The elements in a particular WPAN can maintain their associated status without interference from other WPANs even when the other WPANs are within signal transmission range. This is possible because each element of the WPAN has a unique ID that can be included in the SR-LP transmission so that other elements in that WPAN and the relay link(s) respond in general only to direct signals from within the designated WPAN. Signals can be exchanged between different WPANs via relay links 32, 34 to a central monitoring point (e.g., base station 35 or equivalent in a field location). However, persons of skill in the art will understand that inter-WPAN communication elements can be included in a WPAN to permit certain signals to be exchanged directly among nearby WPANs if that is desired.

Figure 2:
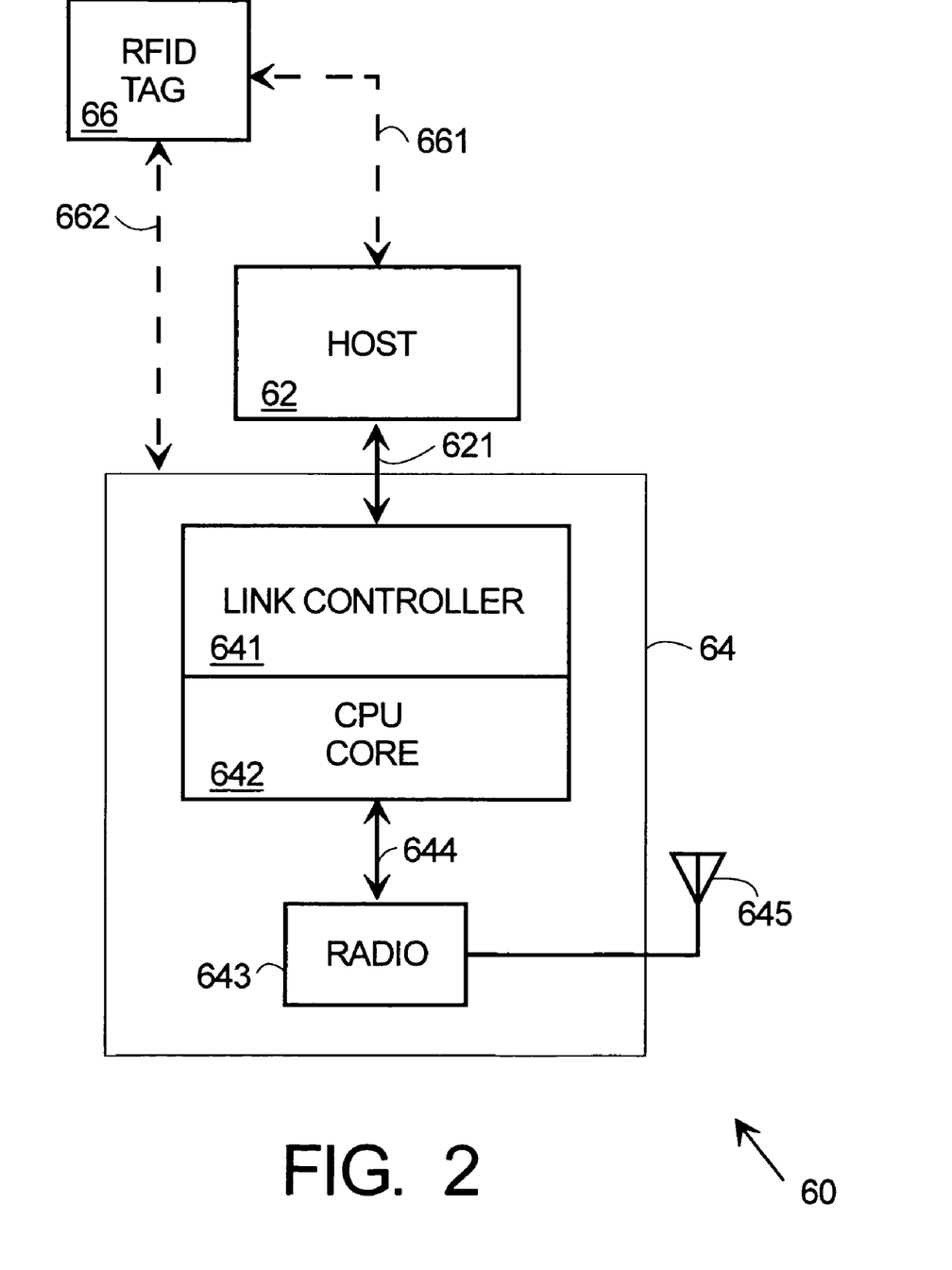
FIG. 2 is a simplified schematic diagram of a single representative element of the WPAN of FIG. 1.

FIG. 2 is a simplified schematic diagram of single representative element 60 of WPAN 40 of FIG. 1, illustrating the basic features thereof. Element 60 includes host 62, SR-LP communicator 64 and RFID tag function 66. Host 62 provides any of the functions previously listed (e.g., PC, PDA, CELL, PAG, WRIST, BCR, Hazmat detector, temperature sensor, pressure sensor, GPS, etc.) or any others that may be desired. SR-LP communicator 64 is preferably but not essentially a Bluetooth communicator with, for example, link controller 641 coupled to HOST 62 by link or bus 621, CPU core 642 coupled to link controller 641 and radio transceiver 643 by link or bus 644. Antenna 645 is coupled to radio 643 for sending and receiving the SR-LP signals generated by communicator 64. A booklet entitled "*Bluetooth Beginner's Guide*" explaining how a Bluetooth communicator functions may be obtained from the North American Headquarters of Ericsson, Inc., Plano, Tex. As explained therein, Bluetooth devices are capable of self-organizing, that is, of forming ad-hoc local networks with other Bluetooth devices within signal communication range, e.g., ad-hoc network 48 of devices 44 within outline 46 of FIG. 1. One (or more) of the elements within ad-hoc network 48 will act as a local "master" and the others will be "slaves". In addition to automatically forming ad-hoc network 48, the local master will look for a communication link (e.g., link 33) to a base station (e.g., base station 35) able to provide an association table to define a WPAN (e.g., WPAN 40) from among the ad-hoc network elements (e.g., from among elements 44). $$

RFID tag 66 is shown as a separate part within element 60, but this is merely for convenience of explanation. It may be coupled to HOST 62 by link or bus 661 and/or to SR-LP communicator 64 by bus or link 662, but this is not essential. The function of RFID tag 66 is to receive "Who are you?—Where are you?" signals 51 from base station 35 and transmit responses 51' so that base station 35 may locate RFID tag 66 (and therefore potential WPAN element 60) and track its movement. Suitable RFID tags are commercially available. While RFID tag 66 is shown in FIG. 2 as being an independent element, this is not essential and not intended to be limiting. In general the transponder function provided by RFID tag 66 may be stand-alone or coupled to or integrated either in HOST 62 and/or communicator 64. All three arrangements are useful. The ability to use a stand-alone RFID tag permits any Bluetooth equipped electronic device to be quickly added to the possible list of automatic association WPAN elements by merely attaching a stand-alone RFID tag and using it in conjunction with system 20 of the present invention. This is a great convenience. Alternatively, the RFID tag function may be integrated with other electronic functions of element 60. Either arrangement is useful.

Figure 3:
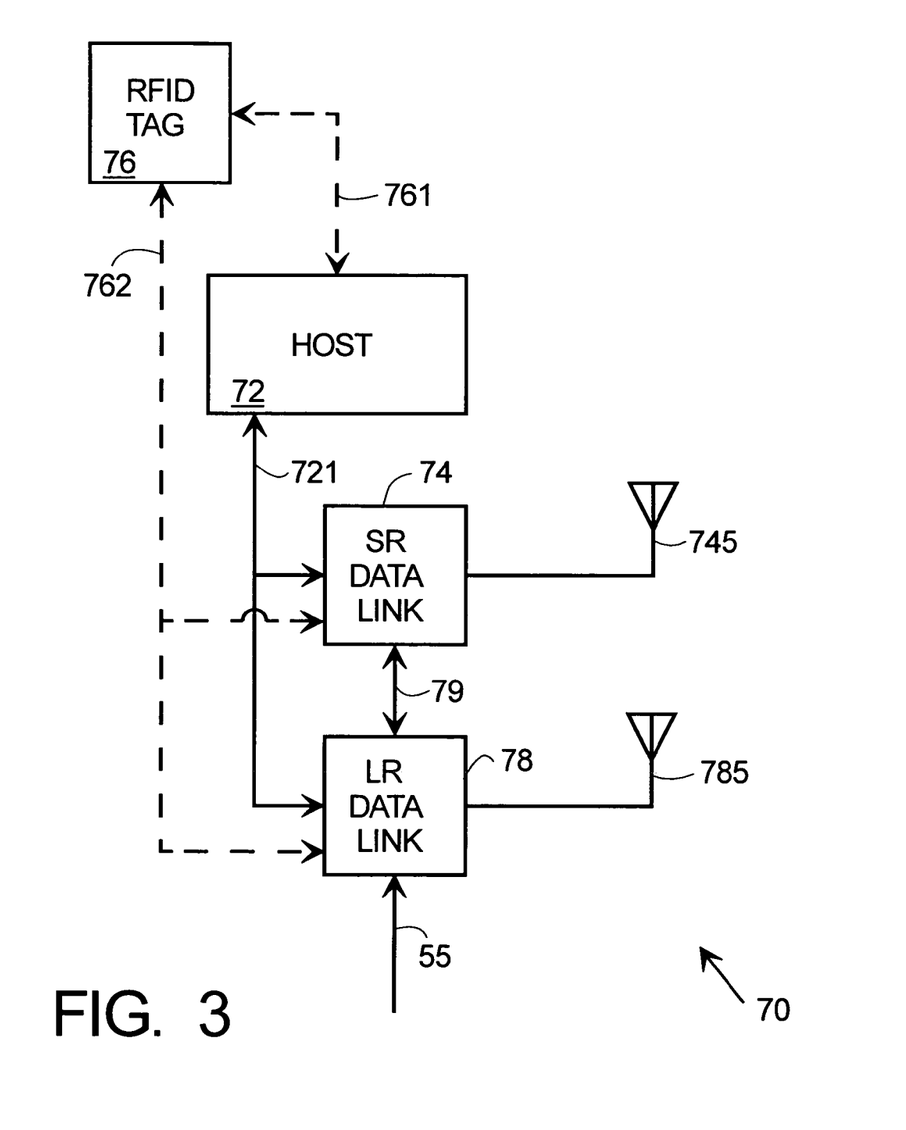
FIG. 3 is a simplified schematic diagram of a representative relay unit of the WPAN for communicating with a base station of FIG. 1.
Figure 4:
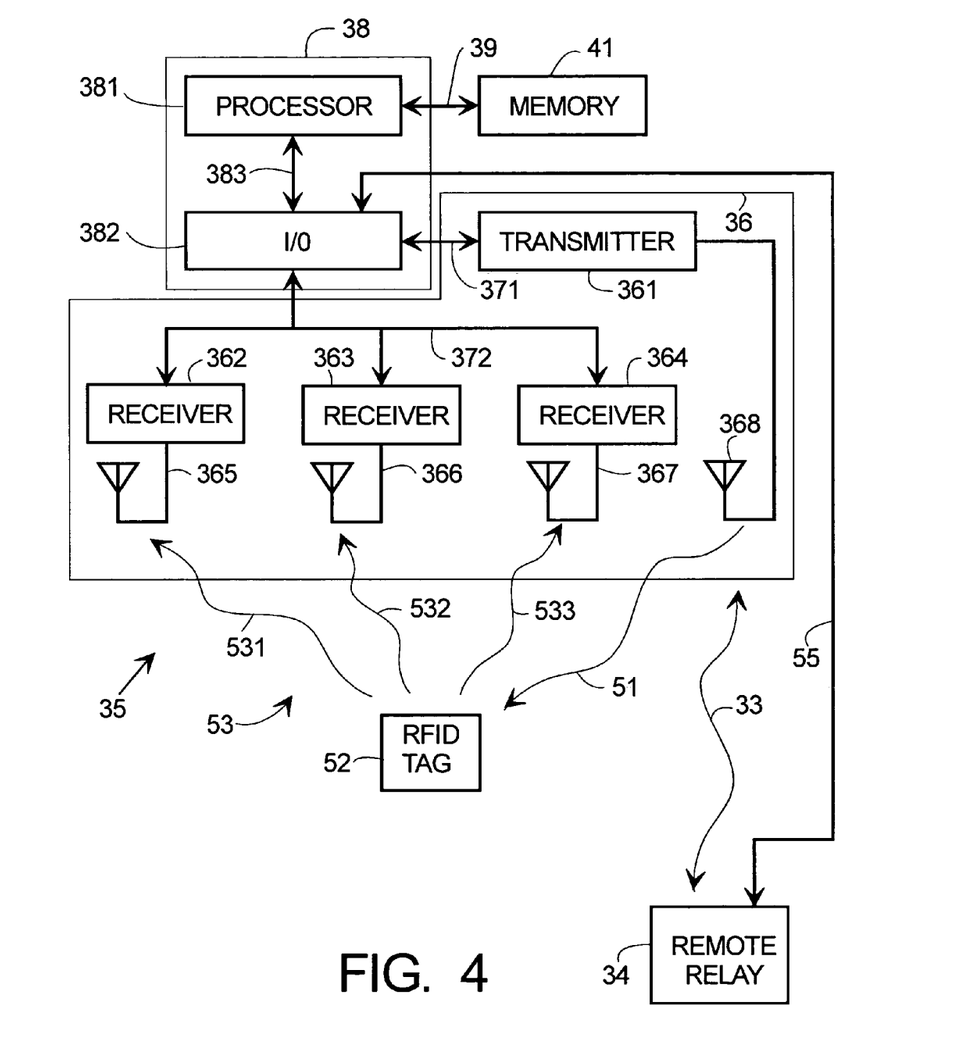
FIG. 4 is a simplified schematic diagram of the base station of FIG. 1.

FIG. 3 is a simplified schematic diagram of remote relay unit 70 whereby WPAN 40 can communicate with server 38 of base station 35. In FIG. 1, element 34 is shown as providing the remote relay function. However, any of elements 22, 24, 26, 28, 30, 32, 34 can be configured to perform this function. Hence remote relay unit 70 of FIG. 3 is intended to illustrate further details of element 34 or any other element that is selected to perform the communications relay function. Relay element 70 conveniently comprises HOST 72 (in the case of element 34, HOST 72 was a printer, but this is not essential). HOST 72 is analogous to HOST 62 of FIG. 2 and can be any of the elements discussed in connection with FIG. 2, or such other elements as the user may need. It may also be any of the facilities units (water coolers, telephones, copiers, etc.) mentioned earlier. HOST 72 is coupled by bus or link 721 to SR communicator 74 with antenna 745, analogous to communicator 64 with antenna 645 of FIG. 2. This provides the first communication mode of relay 70, i.e., the SR (e.g., Bluetooth) link. Also coupled to bus or link 721 is LR communicator 78 with antenna 785. Communicator 78 provides the second communication mode of relay 70, i.e., the LR (e.g., the 802.11 link). Alternatively, communicator 78 may provide the LR link by communicating with base station 35 over wireline link 53 instead of or in addition to communicating via antenna 785. Either arrangement is useful. Communicators 74, 78 may exchange signals via bus or link 721 or via direct bus or link 79. Either arrangement is useful. Either of communicators 74, 78 may act as the master controller. Among other things, a function of relay 70, 34 is to pass signals from elements 44 of ad-hoc network 48 to base station 35 and vice versa, and pass the association table generated by base station 35 back to selected members of ad-hoc network 48 so they know which should associate to form WPAN 40. Once WPAN 40 has been formed, relay 70, 34 can pass messages back and forth between base station 35 (or its field equivalent) and the members of WPAN 40. FIG. 3 illustrates the situation whereby element 78 provides a LR wireless link such as an 802.11 link or wireline link via bus or leads 53, but this is not essential. Provided that relay 70 is within range of or coupled to base station 35, any link protocol or arrangement can be used. For example, Bluetooth has a LR-LP wireless link capability that enables any master unit to function as a signal relay. Thus, element 78 in relay 70 may also be a Bluetooth protocol device using the LR-LP Bluetooth mode for communicating with base station 35. As noted earlier, element 78 may also communicate with base station 35 over wireline link 53 if available. Persons of skill in the art will understand that the present invention is not limited to the particular signaling protocols or arrangements or the particular signal relays illustrated herein. What is important is that at least one remote device be available to provide a communication link between WPAN capable devices 44 and base station 35. RFRID tag 76 may optionally be included in relay 70 communicating with data links 74, 78 over leads or bus 762 and to host 72 via leads or bus 761, FIG. 4 is a simplified schematic diagram of base station 35 of FIG. 1, providing further details. Base station 35 automatically determines the locations of elements 22-32, decides which should be associated and sends the resulting association table to the WPAN elements. Base station 35 can also perform other functions in support of WPAN 40. Base station 35 comprises main hub transceiver 36, location server 38, and memory 41. Location server 38 comprises processor 381 coupled via link or bus 383 with I/O 382. Processor 381 is coupled via link or bus 39 to memory 41. I/O 382 is coupled via links or buses 371, 371 to main hub transceiver 36. Where remote relay 34 is substantially fixed, I/O 382 may also be coupled to remote relay 34 via wireline bus or link 53, but this is not essential. Main hub transceiver 36 comprises transmitter 361 with antenna 368 and, for example, receivers 362, 363, 364 with antennas 365, 366, 367. I/O 382 is coupled to transmitter 361 via link or bus 371. Receivers 362-364 are coupled to I/O 382 via bus or link 372. Transmitter 361 and receivers 362-364 operate under the control of processor 381. Transmitter 361 sends via antenna 368 outgoing wireless signal 51 that is received by RFID tag 52. Tag 52 represents RFID tags 66, 76 (or integrated tag functions) and any others carried by elements 22, 24, 26, 28, 30, 32, 34 of FIG. 1. Each of tags 52 responds either by backscatter modulation of incoming transmission 51 if it is a passive tag or by generation of a suitable response if it is an active tag, and sends wireless response signals 531-533 back to base station 35. Signals 531-533 are the same signals that follow different spatial paths back to receivers 362-364. Response signals 531-533 are received, for example, by spatially distributed antennas 365-367. Differences in time and/or phases of arrival of signals 531-533 are used by processor 381 in cooperation with receivers 362-364 to determine the ranges from tags 52 to the different antennas 365-367. These range differences permit the spatial locations of tags 52 to be determined by processor 381. While the arrangement shown in FIG. 4 is suitable for determining the location of tags 52, persons of skill in the art will understand that this is merely exemplary and that any other suitable location determining means may also be used. Once the locations of various tags 52 (e.g., 22, 24, 26, 28, etc.) have been determined, processor 381 in cooperation with memory 41 determines which should be associated into a WPAN using the methods previously described. Base station 35 then sends the association table using wireless communication link 33 and/or wireline communication link 53 to remote relay 34, 70, through which it is sent on to elements 22, 24, 26, 28, etc., desired to be associated in the WPAN. As previously explained, wireless communication link 33 may use 802.11 or Bluetooth or any other convenient signaling protocol that can be understood by whatever remote device is functioning as the relay. Persons of skill in the art will also understand based on the description herein that the term "RFID tag" or "tag" is not intended to be limited to a discrete RFID tag but to include those RFID functions that may be integrated with other portions of the electronics of the particular element of which they are a part.

While base station 35 is illustrated in FIG. 4 as comprising a single processor and transmitter with multiple spaced-apart receivers, this is merely for convenience of explanation and persons of skill in the art will understand based on the description herein that any real time location system (RTLS) arrangement may be used, for example and not intended to be limiting, multiple transmitters and a single receiver, multiple transmitters with multiple receivers, and so forth. Further, and not intended to be limiting, transmitter 361 can be a multifunction transmitter able to provide position locating signals 51 as well as information transmitting signals 33 using various signaling protocols, (e.g., 802.11, Bluetooth, Zigbee™, Ultra Wideband (UWB), etc.), or separate transmitters may also be used. Either arrangement is suitable. What is important is that base station 35 be able to determine the location of the individual potential WPAN elements so that it can, by either their real time proximity or proximity as a function of time or cooperative movement or other useful criteria or a combination thereof, decide which to associate into a WPAN and then send that association information to the WPAN elements. A non-limiting example of other useful criteria is the situation where certain PAN capable elements are used in pairs. Suppose that related elements A and B (e.g., a remote headset and a portable transceiver) are found in ad-hoc network 48 and only one meets, for example, the current proximity criteria, nevertheless, both may be included in the WPAN because they are part of a cooperating pair.

Figure 5:
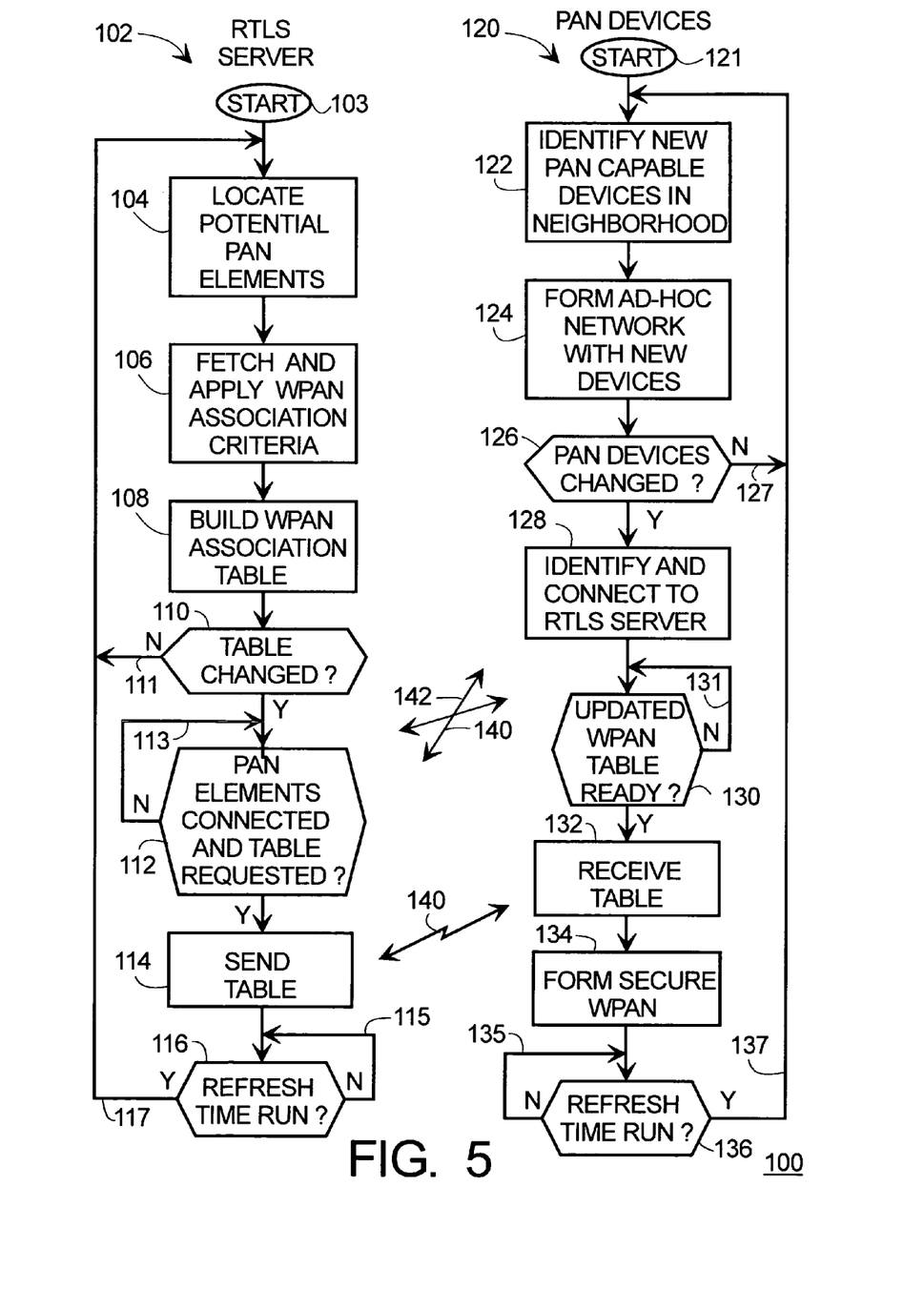
FIG. 5 is a simplified flow chart of the method of the present invention according to a first embodiment.

FIG. 5 is a simplified flow chart of the method 100 of the present invention according to a preferred embodiment. Method 100 comprises steps 102 initiated primarily by RTLS server 38 of base station 35 and steps 120 initiated primarily in the array of potential personal area network (PAN) capable devices (e.g., elements 22, 24, 26, 28, 30, 32, 34, etc.). Referring now to steps 102, START 103 desirably but not essentially occurs on system power-up. LOCATE POTENTIAL PAN ELEMENTS step 104 is executed whereby base station 35 locates the individual PAN elements using, for example the RFID tag functions incorporated therein, as has been previously explained in connection with FIGS. 1-4. FETCH AND APPLY WPAN ASSOCIATION CRITERIA step 106 is then executed, wherein the WPAN association criteria discussed earlier and stored in memory 41 are retrieved by server 38 and applied to the location data determined in step 104. It should be noted that the fetch operation can be performed before or after step 104 for locating the potential PAN elements. Once the location data and the association criteria are available, server 38 can determine which of available PAN elements 44 conform to the association criteria (e.g., are within a predetermined spatial boundary 42 and/or move as a group, etc.) so as to be desirably formed into WPAN 40. The particular association criteria used may depend upon the choices of the system designer or user according to the type of PAN elements likely to be encountered. In BUILD WPAN ASSOCIATION TABLE step 108, the results of step 106 are used to form the association table so that it is ready to be transmitted to the elements of WPAN 40. As used herein the words "association table" are not intended to refer merely to a columnar table of data. These words are intended to generally include any data form or data format for transmitting information about which devices should associate to form the WPAN, and whatever other information is needed for the WPAN to form and function. Thus, as used herein, the words "association table" are intended to have such broad meaning. TABLE CHANGED? query 110 is then desirably but not essentially executed to determine whether the association table determined in step 108 has changed from that determined in the last iteration of steps 102. If the outcome of query 110 is NO (FALSE) then steps 102 of method 100 loop back to start 103 as shown by path 111. Query 110 is desirable to conserve power in the WPAN elements by not signaling them when there is no change in the WPAN association table.

Referring now to steps 120 that begin with START 121, which occurs automatically when multiple PAN capable devices are active and within communication range of each other. In step 122 potential PAN devices 44 (e.g., 22, 24, 26, 28, 30, 32, 34, etc.) exchange signals under the direction of link controllers or CPU cores 641 using radios 643 (see FIG. 2) with each other, i.e., with all PAN capable devices 44 within communication range, so that any new (previously unidentified) PAN capable elements are noted. In the course of this exchange, certain PAN elements will publish themselves as master(s). The remainder are slaves. In step 124, for example following the Bluetooth protocol, the various PAN capable devices or elements exchange sufficient information to form ad-hoc network 48 of PAN capable devices 44 within mutual communication range, including any new PAN capable devices that had not been noted in previous iterations of steps 120. PAN DEVICES CHANGED? query 126 is then desirably but not essentially executed wherein it is determined whether the ad-hoc network of PAN devices formed in step 124 contains new members not previously noted in the last iteration of steps 120. If the outcome of query 126 is NO (FALSE) then steps 120 of method 100 loop back to start 121 as shown by path 127. This is desirable to conserve power in wireless elements 44 under circumstances where no new members are detected by eliminating the need to signal to base station 35 to report "no change." If the outcome of query 126 is YES (TRUE), then in step 128, ad-hoc network 48 formed by PAN capable devices 44 uses remote relay 34, 70 to identify and connect via main hub transceiver 36 or wireline link 53 or alternate communication path to RTLS server 38 of base station 35, looking for an association table. Where a particular remote relay 34, 70 is not available, any master WPAN device can function as the relay provided that it is in communication range with base station 35.

RTLS server 38 and ad-hoc network 48 exchange information as indicated by arrows 140, 142 so that RTLS server 38 can determine in step 112 (e.g., via relay 34, 70 or equivalent) whether or not PAN elements 44 are connected and ready to receive a WPAN association table. Similarly, PAN elements 44 can interrogate RTLS server 38 to determine in query 130 whether a WPAN association table is ready, or alternately RTLS server 38 tells PAN elements 44 that the WPAN association table is ready to be transmitted. Thus, query 130 is desirable but not essential. If the outcome of either query 112, 130 is NO (FALSE) then method 100 loops back as shown by paths 113, 131 until both the WPAN association table is ready and potential PAN elements 44 are coupled to server 38. When the outcome of query 112 is YES (TRUE) and the WPAN association table is ready, then in step 114, RTLS 38 sends the WPAN association table via base hub transmitter 36 or wireline link 53 and remote relay 34 (or an equivalent PAN master) to the elements within outline 42 telling them that they should associate as WPAN 40. This is indicated in method 100 of FIG. 5 by signal 140 coupling SEND TABLE step 114 in step sequence 102 and RECEIVE TABLE step 132 in step sequence 120. Signal 140 preferably complies with the 802.11 signaling standard, but other signaling protocols can be used depending upon the circumstances and/or whether wireline link 53 is available. This association information is automatically transmitted to the elements (e.g., 22, 24, 26, 28) intended to make up WPAN 40. Human intervention is not needed. As indicated in step sequence 120, the elements within outline 42 use the WPAN association table received in step 132 to execute step 134 wherein these elements form a secure WPAN and operate together. In the preferred embodiment but not essentially, REFRESH TIME RUN? queries 116, 136 are executed following SEND TABLE step 114 and FORM SECURE WPAN step 134. In queries 116, 136 it is determined whether predetermined iteration times have elapsed. If the outcomes of queries 116, 136 are NO (FALSE) indicating that it is not yet time to repeat steps 102, 120, then these queries are repeated as indicated by paths 115, 135 respectively. If the outcomes of queries 116, 136 are YES (TRUE) then method 100 loops back to START 102, 120 as indicated by paths 117, 137 respectively. The iteration delay times associated with queries 116, 136 may be the same or different according to the needs of the particular application of method 100. The instructions needed to execute step sequence 102 is conveniently stored in memory 41 and executed by server 38. The hardware and stored instructions needed to execute step sequence 120 are conveniently provided within communicator 64. In the case of the Bluetooth protocol, commercially available hardware can be micro-programmed to execute program sequence 120. Persons of skill in the art will understand how to do this based on the teachings herein and the available Bluetooth standards. One of the advantages of the present invention is that it can be implemented with minimum development and cost by use of, for example, the Bluetooth standard. This significantly simplifies deployment of system 20 according to the present invention.

Figure 6:
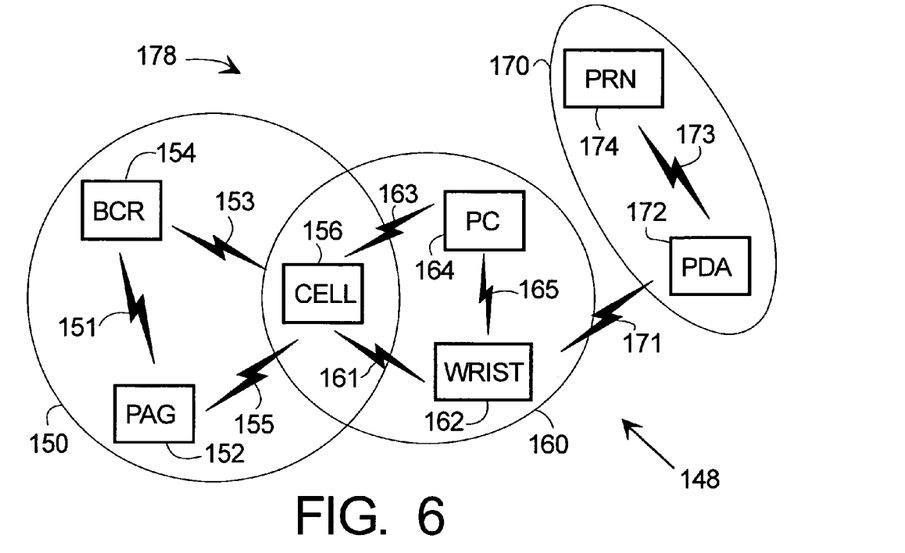
FIG. 6 is a simplified schematic diagram of a number of wireless elements according to a further embodiment of the present invention, adapted to automatically form a WPAN without involvement of a base station.

FIG. 6 is a simplified schematic diagram of system 148 comprising a number of PAN wireless elements 178 according to a further embodiment of the present invention, adapted to automatically form a WPAN without involvement of a base station. System 148 has, by way of example, and not intended to be limiting, first group 150 comprising wireless elements 153, 154, 156 that intercommunicate as indicated by arrows 151, 153, 155, and second group 160 comprising wireless elements 156, 162, 164 that intercommunicate as indicated by arrows 161, 163, 165, and third group 170 comprising, for example, wireless elements 172, 174 that intercommunicate as indicated by arrow 173. Element 156 is common to both groups 150, 160. Groups 160 and 170 intercommunicate as indicated by arrow 171. The elements illustrated in groups 150, 160, 170 are merely exemplary and not intended to be limiting. For example, element 152 can be a two-way pager (abbreviated PAG), 154 can be a bar code reader (abbreviated BCR), element 156 can be a cell phone (abbreviated CELL), element 162 can be a wrist mounted communicator or vital signs monitor or both (abbreviated WRIST), element 164 can be a personal computer-like device (abbreviated PC), element 172 can be a personal digital assistant (abbreviated PDA) and element 174 can be a label or document printer or equivalent (abbreviated PRN), and so forth. The present invention is not limited to these particular elements, and the elements illustrated are merely by way of example and are not intended to be limiting, but rather to generally represent any kind of elements that can be usefully associated into a wireless personal area network (WPAN).

In the present example, elements 152, 154, 156 of group 150 are in communication range of each other as are elements 156, 162, 164 of group 160. But only element 156 is in communication range to provide communication between groups 150, 160. Similarly, element 162 is able to communicate with element 172 of group 170, but not directly with element 174 of group 170. Suppose by way of example that it is desirable to determine whether any or some or all of these elements should associate to form a WPAN and do so without the aid of a central monitor or server, such was used in connection system 20 of FIG. 1. By providing elements having the capabilities illustrated in FIGS. 7 and 8, this can be accomplished. Elements 152, 154, 156, 162, 164, optional element 172 and further optional element 174 are collectively referred to as personal area network (PAN) elements 178. One of more of these elements may be capable of communicating with a central server or network and may act as a bridge on behalf of other elements of the WPAN after it is formed, but this is not essential for the present invention.

Figure 7:
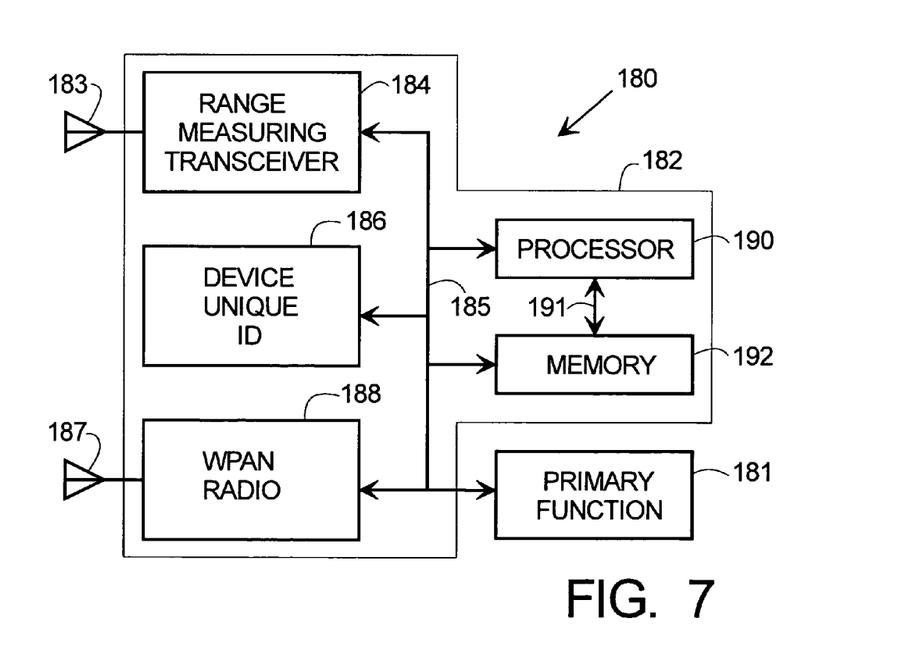
FIG. 7 is a simplified schematic block diagram of a single representative wireless element of FIG. 6.
Figures 8A, 8B:
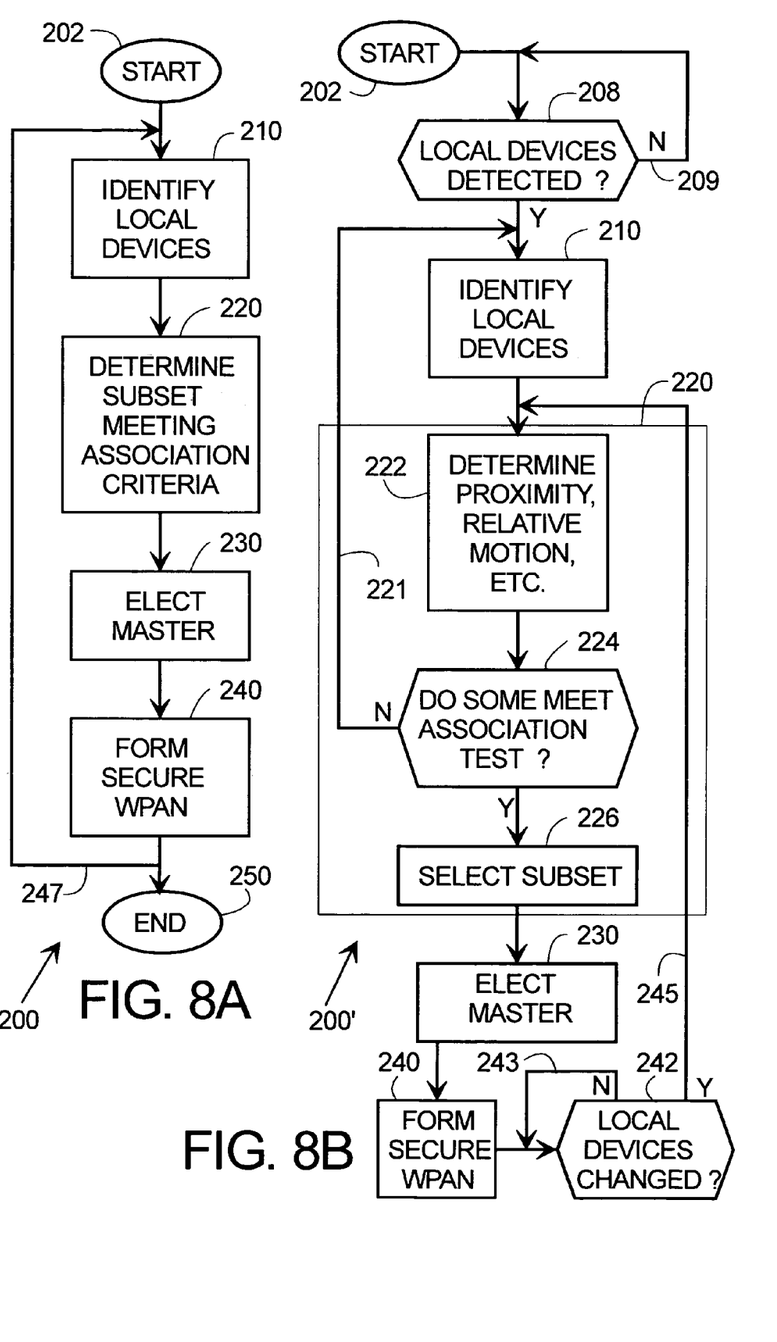
FIGS. 8A-B are simplified flow charts of the method of the present invention according to further embodiments.

FIG. 7 is a simplified schematic block diagram of single representative element 180 of PAN candidates 178 of FIG. 6. FIGS. 8A-B illustrate method 200, 200' carried out by system 148 of FIG. 6 and element 180 of FIG. 7. Referring now to FIG. 7, element 180 represents any of candidate PAN elements 178. Each element 180 has primary function or subsystem 181 and WPAN association function or subsystem 182. Primary function or subsystem 181 can be any of those functions illustrated above (e.g., BCR, PAG, CELL, PC, WRIST, PDS, PRN) and/or any other function. WPAN association function or subsystem 182 allows some or all of elements 178 to identify each other, select a master element and associate into a WPAN if they meet predetermined association criteria. WPAN association function or subsystem 182 conveniently comprises range-measuring transceiver 184 with antenna 183, device unique identification (ID) 186, WPAN radio 188 with antenna 187, processor 190 and memory 192. Range measuring transceiver 184 can include RFID tag components that are addressable by other PAN elements 178. Elements 181, 184, 186, 188, 190, 192 are conveniently coupled by bus or leads 185. Processor 190 and memory 192 may also or alternatively have direct memory access (DMA) bus or connection 191. WPAN association function or subsystem 182 is illustrated as comprising individual elements or functions 184, 186, 188, 190, 192, but this is merely for convenience of explanation and not intended to be limiting. Persons of skill in the art will understand based on the description herein that any or all of the individual functions represented by elements 184, 186, 188, 190, 192 may be integrated within primary function 181 or elsewhere in device or element 180. For example, and not intended to be limiting, the function of range measuring transceiver 184 and WPAN radio 188 may be combined, or either or both may be combined with a transceiver contained within primary function 181. Likewise, processor 190 and/or memory 192 may be part of primary function 181. What is important is that element 180 is capable of performing the functions described herein not whether they are performed by separate circuits or elements. The operation of subsystem or function 182 will be more fully understood in connection with the discussion of flow charts 200, 200' of FIGS. 8A-B.

A wireless personal area networks (WPAN) is generally formed from multiple elements that have something in common, as for example, they are in close proximity to each other and/or they move as a group or both and/or they are functionally related (e.g., a headset and its transceiver). For example, a public safety officer, a military person or a rescue worker may conveniently carry a variety of equipment that should be associated in a WPAN. Non-limiting examples of such equipment are communication headsets, communication transceivers, environmental monitors, vital signs monitors, breathing gas tanks and regulators, data transceivers, position locators, audio or visual direction displays and/or maps, and so forth. A warehouse worker may carry a bar-code reader, a label printer, a data communicator, a personal communicator, an inventory tracker, and so forth. These personnel not only carry some or all of this equipment as they perform their duties, but also may come within communication range of other equipment that is in the neighborhood but not a part of their kit. Thus, the WPAN association function must be able to automatically select the proper elements to make up the worker's WPAN and ignore those that are merely in communication range but not associated with the worker's WPAN function. WPAN association criteria are conveniently stored in memory 192 and used by subsystem or function 182 to select those elements that should form the WPAN based on these predetermined association criteria. The WPAN association criteria may be the same as those already discussed in connection with system 20 and FIGS. 1-5 or may be different depending upon the needs of the user. For convenience of explanation it is assumed in the discussion of FIGS. 6-8 that proximity and collective movement are the preferred association criteria. But, persons of skill in the art will understand based on the description herein that other association criteria can also be used. As used herein, the words "association criteria" are intended to include whatever criteria may be selected by the system designer or user and not be limited merely to the examples provided herein.

FIGS. 8A-B are simplified flow charts 200, 200' of the method of the present invention according to further embodiments. Flow charts 200, 200' perform substantially the same function but differ in detail. Referring now to FIG. 8A, method 200 begins with START 202 that desirably occurs when the individual PAN elements or devices (e.g., represented by typical element 180) are powered up. Then in step 210 WPAN radios 188 and/or range measuring transceivers 184 in cooperation with ID elements 186, of various candidate PAN elements 178, identify and exchange ID's with those elements within communication range. Persons of skill in the art will know how this is accomplished, using for example, the Bluetooth, Zigbee or other wireless protocol discussed earlier. In step 220, range-measuring transceiver 184 (in cooperation with processor 190) determines the subset of PAN devices from among those identified in step 210 that meet the association criteria (e.g., suitable range, collective motion, signal strength, etc.). In the preferred embodiment, range and relative motion are determined, for example, by using RFID phase difference of arrival (PDOA) measurements. PDOA provides the best present current positional accuracy (e.g., about 1 meter or better), but any suitable system maybe used. Any ranging system capable of accuracies within the signal communication range of various PAN candidate elements or devices 178 may be used. By making a series of ranging measurements correlated with the unique ID of each element, processor 190 can determine which of PAN candidate elements 178 are moving as a group. Those elements that satisfy the association criteria stored in memory 192, for example, those that are close together and move as a group, are identified as the subset of PAN candidates that should be associated into the WPAN. In the preferred embodiment, each element 180 of the PAN candidates 178 determines, with respect to the other elements within its communication range:

(a) Its mutual physical proximity to the other PAN candidate devices;

(b) The signal strength or communication channel robustness to/from the other PAN candidate devices; and (c) Whether it is substantially stationary or moving with respect to the other PAN candidate devices.

In the preferred embodiment, individual elements 180 within PAN candidate group 178 share their discovery list with each other and, preferably, include their relative signal strength, communication channel robustness and relative motion. Some of elements 178 will have different discovery lists. For example, elements within group 150 will have a discovery list that differs from those in groups 160 and 170 and vice versa. Similarly, the relative signal strength of signaling paths 151, 153, 155, 161, 163, 165, 171, 173 will also likely differ. The relative motion results will differ for those WPAN candidate elements that are not moving with the rest.

In step 230 a master element is "elected", that is, determined from among the identified subset of PAN elements. For example, those elements with the largest number of associations should nominate themselves to be the master element of the WPAN network. This capability is well known in the Bluetooth, Zigbee and other wireless environments. If there is a tie for two or more masters, then various arbitration criteria may be used to declare a winner. For example, the device with the highest total signal strength across the intercommunicating devices is a desirable master element. Alternatively, the device that is able to intercommunicate directly with the largest number of subset devices is also a possible master element or device. If there continues to be a tie, then the tied devices can select a random number and decide which will be the network master based on the highest (or lowest) random number value chosen by the various candidate master elements. Random number selection continues until only one device is left, which then designates itself the master and announces its "election" to the other WPAN candidate devices of the subset. The foregoing method of election of a master element is merely exemplary and not intended to be limiting. Various other criteria can also be used, for example, and not intended to be limiting, overall device capability, functionality, memory size, power consumption, battery capacity and so forth. Such factors (and others) may be given various weightings in the scoring process used to select the master element. Persons of skill in the art will understand how to choose the optimum master selection protocol depending upon the types of devices generally intended to form the WPAN. The appropriate protocol is conveniently stored in memory 192 of candidate devices 178 so that they are able to automatically and autonomously form the WPAN by following the steps of method 200, 200'.

Each device 180 locates and identifies the other device(s) with which it can communicate, and determines whether or not it should associate therewith based on the association criteria stored in memory 192, e.g., predetermined proximity, duration of relative proximity, relative motion, and/or other such other criteria as the user or system designer may select. Selection criteria may be based on specific application needs of a particular user. For example, if a wearable head-set device is seeking a connection to a wide area network to make a cell phone call instead of a local area network to make a voice over internet protocol (VOIP) call, but none of the associated WPAN devices are capable of cellular network connection, then that device may on its own temporarily seek connection through ad-hoc network bridging to another device outside of the normal WPAN that does have this capability. For example, WPAN 160 of FIG. 6 can link over path 171 to WPAN 170 which may be capable of providing voice service to WPAN 160. After electing the master device in step 230, then in step 240, the subset of elements whose situation meets the association criteria discussed above associate to form a secure WPAN and method 200 loops back to START 202, as shown by path 247, or proceeds to END 250 on power-down. As used herein in connection with choosing or designating a master device or element from among the various PAN devices, the words "elect" and "electing" are intended to include any means or method for accomplishing this selection and the examples given above are not intended to be limiting.

Method 200' of FIG. 8B illustrates substantially the same process flow as method 200 of FIG. 8A but adds additional details. The same reference numbers are used in method 200' for substantially the same steps as in method 200. Referring now to FIG. 8B, following START 202 (e.g., on power-up), method 200' proceeds to LOCAL DEVICES DETECTED? query 208 wherein each element 180 determines (e.g., using subsystem or function 182) whether or not there are one or more other candidate PAN devices within communication range. If the outcome of query 208 is NO (FALSE), abbreviated as "N", then method 200' loops back to START 202 and step 208 is repeated until a YES (TRUE), abbreviated "Y", is obtained, whereupon method 200' proceeds to step 210. In step 210 method 200' identifies the local devices that it has found (e.g., obtains their unique IDs) from function 186. In FIG. 8B, step 220 is sub-divided into steps 222, 224, 226. In step 222, subsystem 182 determines the proximity and/or relative motion and/or signal strength as previously noted. Then, DO SOME MEET ASSOCIATION TEST? query 224 is executed wherein it is determined whether or not some of the identified devices satisfy the association criteria stored in memory 192. If the outcome of query 224 is NO (FALSE) then method 200' loops back to step 210 as shown by path 221 and steps 210, 222, 224 are repeated until step 224 yields a YES (TRUE) outcome. When the outcome of query 224 is YES (TRUE) then the subset of identified devices that meet the association criteria are chosen in step 226 as the WPAN candidates and the other PAN elements not meeting the association criteria are henceforth ignored. In step 230, the master device is elected and in step 240 the secure WPAN is formed, as already discussed in connection with method 200. The master device performs the function of controlling the ad-hoc network communications within the WPAN and any external communication links to a base station and/or other WPANs.

Then, LOCAL DEVICES CHANGED? query 242 is desirably but not essentially executed wherein it is determined whether or not further or different or fewer devices are now in communication proximity. Stated another way, identification query 242 determines whether a further device has appeared within communication range and/or whether an existing device has dropped out of communication range. If the outcome of query 242 is NO (FALSE) then method 200' loops back as shown by path 243 and step 242 is repeated until a YES (TRUE) outcome is obtained whereupon, as shown by path 245, method 200' returns to step 220 to determine, for example, the proximity, relative motion and signal strength of the modified group of element(s). Steps 222, 224, 226, 230, 240 are repeated. The elements that continue to meet the association criteria are retained in the WPAN, elements that no longer meet the association criteria or are no longer detected are dropped and any newly acquired elements meeting the association criteria are added to the WPAN. Method 200' repeats as described above as long as the various elements are powered-up.

The advantages of the arrangement of FIGS. 6-8 are that the WPAN is automatically and autonomously formed (and re-formed) from the available candidate PAN elements without manual intervention and without the need for a central base station. These are particular features of this embodiment of the present invention. Element proximity, collective movement and other association criteria are determined locally using the capabilities of the candidate PAN elements themselves without depending upon a central monitoring and position determining station. This is a significant advantage in many circumstances where the WPAN association needs to take place in the field away from a central monitoring station. Many such situations exist where availability of a WPAN is important, as for example, for disaster rescue, military operations, law enforcement, medical emergencies, and so forth, that occur in unpredictable and changing locations where there is often no infrastructure and no central monitor site, even though one or more of the elements (e.g. a cell phone) may provide a communication link to a network. The present invention is particularly well adapted to provide WPANs under such circumstances and is therefore, very useful.

The foregoing description of the present invention assumes that each of candidate PAN devices 178 has the elements or functions of representative device 180, but it is not essential that each candidate device be equally capable as far as the functions described in connection with representative device 180 is concerned. For example, a separate range measuring function may not be needed in all of elements 178. For example, where their communication range is extremely short, the presence/absence of a communication signal may be sufficient to establish sufficient range information and in these circumstances range measuring transceiver 184 is not essential. If such potential WPAN elements can measure signal strengths from others, for example, using WPAN radio 188 and processor 190, and how the signal strengths change with time, such elements may determine which elements are in their vicinity and moving as a group. While this may not be as accurate as the output from range measuring transceiver 184, it can provide sufficient information to compare to the association criteria stored in memory 192. Thus, while it is preferred that each potential WPAN element include range-measuring transceiver 184, this is not essential. All that is needed in most circumstances is that PAN elements 178 be able to determine proximity within a comparatively small range and identify collective movement. Thus, significant variation of functional capabilities may be tolerated among PAN elements 178, i.e., they need not all have every sub-element of device 180, and still be able to participate in forming a WPAN in the manner generally described herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A wireless Personal Area Network (PAN) element, comprising:
   a primary function subsystem; and
   a wireless personal area network (WPAN) association function subsystem coupled to the primary function subsystem, wherein the WPAN association function subsystem includes a range measuring transceiver having radio frequency identifier (RFID) tag components, wherein the range measuring transceiver is addressable by one or more other PAN elements and is adapted to be addressed by the one or more other PAN elements in order to exchange identifiers with at least some of the one or more other PAN elements, and wherein the PAN element is also adapted to determine ranges and relative motions of at least some of the one or more other PAN elements using RFID measurements, and automatically to associate with a WPAN that includes a subset of the one or more other PAN elements that satisfy predetermined association criteria that include range and relative motion.

2. The element of claim 1 further comprising memory for storing the predetermined association criteria within the element.

3. The element of claim 1 wherein the WPAN association function subsystem comprises:
a processor;
a unique identification means coupled to the processor; and
the range measuring transceiver coupled to the processor.

4. The element of claim 3 further comprising a WPAN radio coupled to the processor and the primary function subsystem.

5. The element of claim 3 further comprising a memory coupled to the processor.

6. The element of claim 3 wherein the range measuring transceiver measures range by means of phase difference of arrival of a radio signal.

7. A system of intercommunicating elements adapted to automatically form a Wireless Personal Area Network (WPAN) from all or part of said elements, comprising:
a plurality of the elements, wherein an element of the plurality of elements each include a first communicator associated with primary functions of the element;
a second communicator coupled to the first communicator, wherein the second communicator include a range measuring transceiver having radio frequency identifier (RFID) tag components, wherein the range measuring transceiver is addressable by one or more other elements of the plurality of the elements, and is adapted to be addressed by the one or more other elements in order to exchange identifiers with at least some of the one or more other elements, and wherein the element is also adapted to determine ranges and relative motions of at least some of the one or more other elements using RFID measurements, and automatically to associate with the WPAN that includes a subset of the one or more other elements that satisfy predetermined association criteria that include range and relative motion.

8. The system of claim 7 wherein the second communicator comprises:
the range measuring transceiver;
a processor coupled to the transceiver; and
wherein the range measuring transceiver and processor cooperate to determine range and relative motion of elements within communication range of the first communicator.

9. The system of claim 8 further comprising identification means uniquely identifying each intercommunicating element.

10. The system of claim 8 further comprising a memory coupled to the processor for storing the predetermined association criteria to which the range and relative motion are compared.

11. The system of claim 7 wherein the second communicator determines proximity to and relative motion of the intercommunicating elements.

12. A method for forming a Wireless Personal Area Network (WPAN) from among multiple wireless elements, comprising:
identifying those wireless elements within mutual communication range;
determining range and relative motion of the wireless elements using RFID phase difference of arrival measurements;
determining a subset of elements meeting predetermined association criteria, which include the range and the relative motion, from among the identified wireless elements;
electing a master element from among one or more candidate master elements of the subset of elements that nominate themselves to be the master element; and
forming a WPAN from the subset of elements with the master element.

13. The method of claim 12 further comprising before the identifying step, determining whether any wireless elements are within mutual communication range.

14. A method for forming a Wireless Personal Area Network (WPAN) from among multiple wireless elements, comprising:
identifying those wireless elements within mutual communication range;
determining a subset of elements meeting predetermined association criteria from among the identified wireless elements by
measuring range and relative motion of the identified elements,
comparing the measured range and relative motion to range and relative motion association criteria, and
selecting as the subset those elements whose range and relative motion meet the association criteria;
electing a master element from among one or more candidate master elements of the subset of elements that nominate themselves to be the master element; and
forming a WPAN from the subset of elements with the master element.

15. The method of claim 14 further comprising, prior to the selecting step, inquiring whether any of the identified elements meet the range and relative motion association criteria and if not, repeating the identifying and determining steps.

16. The method of claim 14 farther comprising after the forming step, performing an identifying step to determine whether any farther elements have appeared within or any previously identified devices have disappeared from mutual communication range.

17. The method of claim 14 further comprising after the forming step repeating an identifying step until a further element has appeared within or an existing element has disappeared from communication range, and then repeating the determining, electing and forming steps for the such modified group of elements within communication range.

18. The method of claim 14 wherein the comparing step comprises comparing the measured range and relative motion to range and relative motion association criteria stored within the wireless element.

19. A wireless Personal Area Network (PAN) element, comprising:
a primary function subsystem; and
a wireless personal area network (WPAN) association function subsystem coupled to the primary function subsystem, wherein the WPAN association function subsystem includes a range measuring transceiver having a WPAN radio, wherein the range measuring transceiver is addressable by one or more other PAN elements and is adapted to be addressed by the one or more other PAN elements in order to exchange identifiers with at least some of the one or more other PAN elements, and wherein the PAN element is also adapted to determine ranges and relative motions of at least some of the one or more other PAN elements using ranging measurements, and automatically to associate with a WPAN that includes a subset of the one or more other PAN elements that satisfy predetermined association criteria that include range and relative motion.

* * * * *

UNITED STATES PATENT AND TRADEMARK OFFICE
CERTIFICATE OF CORRECTION

PATENT NO.        : 7,403,744 B2
APPLICATION NO. : 10/883005
DATED             : July 22, 2008
INVENTOR(S)       : Raj Bridgelall It is certified that error appears in the above-identified patent and that said Letters Patent is hereby corrected as shown below:

Col. 18, Line 44 "farther" should be changed to --further--;

Col. 18, Line 46 "farther" should be changed to --further--.

Signed and Sealed this

Fourteenth Day of October, 2008

JON W. DUDAS
*Director of the United States Patent and Trademark Office*